US010796249B2

(12) United States Patent
Schucan et al.

(10) Patent No.: US 10,796,249 B2
(45) Date of Patent: Oct. 6, 2020

(54) TICKETING METHOD AND SYSTEM

(71) Applicant: FAIRTIQ AG, Bern (CH)

(72) Inventors: Gian-Mattia Schucan, Bern (CH);
Jonas Lutz, Bern (CH)

(73) Assignee: FAIRTIQ AG, Bern (CH)

( * ) Notice: Subject to any disclaimer, the term of this patent is extended or adjusted under 35 U.S.C. 154(b) by 560 days.

(21) Appl. No.: 15/328,272

(22) PCT Filed: Jul. 22, 2015

(86) PCT No.: PCT/EP2015/066709
§ 371 (c)(1),
(2) Date: Jan. 23, 2017

(87) PCT Pub. No.: WO2016/012475
PCT Pub. Date: Jan. 28, 2016

(65) Prior Publication Data
US 2017/0220958 A1    Aug. 3, 2017

(30) Foreign Application Priority Data
Jul. 24, 2014   (EP) .................................. 14178307

(51) Int. Cl.
G06Q 10/02     (2012.01)
G06Q 20/32     (2012.01)
(52) U.S. Cl.
CPC ........... *G06Q 10/02* (2013.01); *G06Q 20/327* (2013.01); *G06Q 20/3278* (2013.01)
(58) Field of Classification Search
CPC .... G06Q 30/0645; G06Q 10/02; G06Q 30/06; G07C 5/008
(Continued)

(56) References Cited

U.S. PATENT DOCUMENTS 8,478,638 B2 * 7/2013 Postrel ................. G06Q 20/105
705/14.1
2003/0236748 A1 * 12/2003 Gressel ................ G06Q 20/105
705/41
(Continued)

FOREIGN PATENT DOCUMENTS

EP      2 747 035       6/2014
JP      2001-307149 A   11/2001
(Continued)

OTHER PUBLICATIONS

International Search Report and Written Opinion, dated Aug. 13, 2015, in International Application No. PCT/EP2015/066709.

*Primary Examiner* — Vanel Frenel
(74) *Attorney, Agent, or Firm* — Medler Ferro Woodhouse & Mills PLLC; Teresa U. Medler

(57) ABSTRACT

A ticketing method for issuing a service ticket of a transport system to a passenger comprises: checking-in the passenger via a mobile device of the passenger upon accessing a vehicle of the transport system; checking-out the passenger via the mobile device upon exiting a vehicle of the transport system; and a server computer automatically calculating a price for a travel of the passenger within the transport system by evaluating check-in data representing the checking-in of the passenger and check-out data representing the checking-out of the passenger. The ticketing method further comprises: a sensor of the mobile device of the passenger generating a sensor data signal; transferring the sensor data signal from the mobile device of the passenger to the server computer; the server computer automatically calculating a travel movement pattern dataset based on sensor data associated to the transferred sensor data signal; the server computer automatically, comparing the travel movement pattern dataset to a transport system movement pattern dataset; the server computer automatically identifying a
(Continued)

non-compliance of the travel movement pattern dataset with regard to the transport system movement pattern dataset; and the server computer generating the check-out data using the identified non-compliance. The method according to the invention allows for conveniently, efficiently and reliably issuing tickets for travelling with public transport systems.

16 Claims, 1 Drawing Sheet

(58) Field of Classification Search
USPC ...... 705/5, 7, 28, 18, 21, 13, 1.1; 340/572.1, 340/540
See application file for complete search history.

(56) References Cited

U.S. PATENT DOCUMENTS

| | | | | |
|---|---|---|---|---|
| 2007/0265891 | A1* | 11/2007 | Guo | G06O 10/02 705/5 |
| 2009/0237245 | A1* | 9/2009 | Brinton | G07C 5/008 340/540 |
| 2011/0060600 | A1* | 3/2011 | Fox | G01S 19/51 705/1.1 |
| 2012/0109721 | A1* | 5/2012 | Cebon | G06Q 30/06 705/13 |
| 2012/0123909 | A1* | 5/2012 | Kannenov | G06Q 30/0641 705/27.1 |
| 2012/0303259 | A1* | 11/2012 | Prosser | B60L 53/57 701/400 |
| 2013/0260791 | A1 | 10/2013 | Malinovskiy et al. | |
| 2014/0200038 | A1 | 7/2014 | Rao et al. | |
| 2015/0242944 | A1* | 8/2015 | Willard | G06Q 30/0645 705/5 |
| 2015/0262195 | A1* | 9/2015 | Bergdale | G06Q 20/0457 705/5 |

FOREIGN PATENT DOCUMENTS

| | | |
|---|---|---|
| JP | 2004-334581 A | 11/2004 |
| JP | 2005-100023 A | 4/2005 |
| WO | 2011/066327 | 6/2011 |

\* cited by examiner

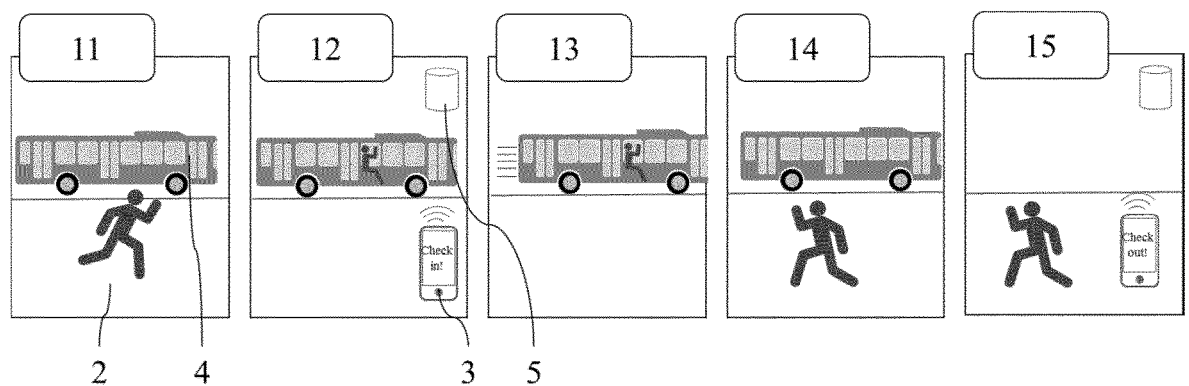

TICKETING METHOD AND SYSTEM

TECHNICAL FIELD

The present invention relates to a ticketing method according to the preamble of independent claim 1 and more particularly to a computer program for implementing such a ticketing method within a ticketing system.

Ticketing methods comprising checking-in a passenger via his mobile device upon accessing a vehicle of a transport system, checking-out the passenger via the mobile device upon exiting a vehicle of the transport system and calculating a price for a travel of the passenger within the transport system by evaluating information about the checking-in and information about the checking-out can be used for semi-automatically providing a service ticket of the transport system to the passenger and charging him for using the transport system.

BACKGROUND ART

Public transport ticketing has developed over the years from a purely paper based system into a variety of electronic and mobile ticketing schemes. Conventionally, a passenger intending to use a transport system buys a ticket at an attended counter or at a ticket vending machine. Particularly, when a ticket vending machine is involved the passenger usually has to know the routes to the destination and the pricing schemes which often leads to wrongly issued tickets. Thus, such conventional ticketing is comparably cumbersome, costly and time consuming.

To avoid the need for passengers to fully understand the often complex pricing schemes, Check-in/Check-out (CICO) systems have been created. In most of these CICO-systems entry/exit barriers or wired check-in- and check-out-terminals are provided either in the vehicles of the transport systems or at the stations thereof. The passengers carry corresponding devices such as, e.g., a radio-frequency identification (RFID)-card. Before or upon entering a vehicle the passengers are checked-in via the barriers or terminals communicating with the corresponding devices. Analogously, the passengers are checked-out upon or after leaving the vehicle. Check-in and check-out data is then used to calculate a price of the trip from check-in to check-out and the passengers can accordingly be charged.

Further, mobile device technology has allowed implementing CICO systems without expensive entry/exit barriers or vehicle equipment. For example, in some systems the passengers check-in and check-out by sending a signal to the transport service provider.

However, without the usage of exit barriers, a significant number of passengers forgets to check-out of the system, resulting in higher than necessary fares or fines or exclusion from the public transport services. The fear of forgetting to check out may also prevent people from using such systems altogether.

Therefore, there is a need for a ticketing system or method allowing to reliably identifying the usage of a transport system by a passenger and based thereon for charging the passenger for travelling with the transport system.

DISCLOSURE OF THE INVENTION

According to the invention this need is settled by a method as it is defined by the features of independent claim 1 and by a computer program as it is defined by the features of independent claim 14. Preferred embodiments are subject of the dependent claims.

In particular, the gist of the invention is: A ticketing method for charging a passenger for using a transport system comprises: checking-in the passenger via a mobile device of the passenger upon accessing a vehicle of the transport system; checking-out the passenger via the mobile device upon exiting a vehicle of the transport system; and a server computer automatically calculating a price for a travel of the passenger within the transport system by evaluating check-in data representing the checking-in of the passenger and check-out data representing the checking-out of the passenger. The ticketing method particularly further comprises: a sensor of the mobile device of the passenger generating a sensor data signal; transferring the sensor data signal from the mobile device of the passenger to the server computer; the server computer automatically calculating a travel movement pattern dataset based on sensor data associated to the transferred sensor data signal; the server computer automatically comparing the travel movement pattern dataset to a transport system movement pattern dataset; the server computer automatically identifying a non-compliance of the travel movement pattern dataset with regard to the transport system movement pattern dataset; and the server computer generating the check-out data using the identified non-compliance.

The ticketing method can particularly be a computer implemented method. Thereby, the method can be implemented on a computer system which can comprise the mobile device, e.g., as client computer, and a central computer such as a server computer connected to the mobile device. The transport system can particularly be a public or private transport system with buses, trains, trams, subways, planes, similar transport vehicles or any combination thereof.

The term "server computer" can relate to any single computing device or plurality of computing devices forming a central instance accessible by the mobile device or a plurality thereof for performing particular tasks within the ticketing method according to the invention. Typically, such server computers have a data storage such as a hard disk, a flash memory or the like, a processor (CPU), a volatile memory such as a random access memory (RAM) and an interface for connecting to other devices such as the mobile device. The server computer can run an operating system which manages hardware and software resources and provides common services for computer programs. The server computer can execute software or computer programs which provide services to client computers such as the mobile device. In particular, the server computer can execute a computer program performing the steps of the ticketing method specified above and below.

The term "mobile device" in connection with the invention relates to an electronic personal device the passenger carries during his travel or trip with the transport system. It can particularly relate to devices such as smartphones, smartwatches, tablets, laptop computers, personal digital assistants (PDA), media players and the like. Such mobile devices usually have a data storage such as a flash memory or the like, a processor (CPU), a volatile memory such as a random access memory (RAM) and an interface for connecting to other devices such as the server computer. The mobile device can run an operating system which manages hardware and software resources and provides common services for computer programs. It can execute software or computer programs which provide applications to the user or passenger. In particular, the mobile device can execute a computer program performing the steps of the ticketing method specified above and below.

The connection of the mobile device and the server computer can be implemented in any suitable manner. For example, the interface of the mobile device can be a wireless local area network (WLAN) adapter and/or a cellular network mobile phone adapter and the interface of the server computer can be a local area network (LAN) adapter. Via such adapters the mobile device as well as the server computer can be connected to each other via the Internet using standardized protocols such as, beyond others, the hypertext transfer protocol (HTTP) and particularly the secured HTTP (HTTPS).

The term "data signal" as used in connection with the ticketing method can relate to an electromagnetic signal such as an electrical voltage, radio wave, microwave, infrared signal or the like which can be physically transferred over a point-to-point or point-to-multipoint communication channel. Such channels may be copper wires, optical fibers, wireless communication channels, storage media and computer buses. The data signal can represent specific data particularly organized in accordance with a specific protocol such as, for example, the protocols mentioned above. The data itself can be a digital bit stream or the like which represents physical and/or logical conditions and changes or the like. It can particularly be in a format accessible and evaluatable by the server computer, the mobile device and preferably by both.

The term "dataset" as used herein relates to a collection of data. In particular, it can relate to a plurality of data of the same subject such as a collection of data about a pattern of movements of the passenger travelling with the transport system, i.e. the travel movement pattern dataset, or about a pattern of movements of the vehicles of the transport system, i.e. the transport system movement pattern dataset.

The term "vehicle" can relate to any device or apparatus suitable for transporting one or plural human and/or animal beings. For example vehicles can be cars, trains, trams or streetcars, subways, monorails, bicycles, motorbikes, buses, ferries, boats, airplanes, cable cars, ski-lift bows, chairlift chairs and the like.

The term "accessing a vehicle" can particularly relate to starting using the vehicle. For example a vehicle can be accessed by entering it, sitting on it, stepping on it or the like.

The vehicle the passenger is checked-in when accessing can be the same as the vehicle the passenger is checked-out when exiting or another one of the transport system. Alternatively, it can be a different vehicle of the same transport system such as frequently occurring when the passenger changes the vehicles during his travel within the transport system.

The method may also comprise issuing a service ticket with the calculated price. In this connection, issuing the service ticket can be performed partially or in full via the mobile device of the passenger. It can also be virtually performed, e.g. by only billing the calculated price to the passenger.

The term "sensor" in connection with the mobile device can relate to any device or module potentially providing information suitable for the ticketing method. Besides the sensors mentioned in more detail below such a sensor can also be a tag reader which gathers a tag of the vehicle or a camera for catching a identifier such as a tag or a RFID-code or a Quick Response (QR) code or a Bluetooth code or the like.

The term "movement pattern" as used in connection with the invention can relate to any data or information allowing to identify a structure of a movement specific to the transport system or to something else. In this context, the transport system movement pattern can relate to data or information being specific for the vehicle moving within the transport system. This can, e.g., be location, speed, acceleration, deceleration data or information, any combination thereof or the like. The transport system movement pattern can also simply be a reference value such as a specific velocity or the like. For example, the non-compliance can be identified by calculating the travel movement pattern dataset based on the sensor data signal and identifying an inconsistency with the transport system movement. The travel movement pattern can relate to data or information allowing to monitor or evaluate the actual movement of the passenger. It can include, e.g., location, speed, acceleration, deceleration data or information, any combination thereof or the like.

By automatically calculating the travel movement pattern dataset out of the sensor data transformed from the sensor data signal provided by the mobile device, the server computer can efficiently identify and qualify a movement of the passenger. By automatically comparing the travel movement pattern dataset to the transport system movement pattern dataset the server computer can automatically verify if the passenger is using the transport system, i.e. the two movement pattern datasets are compliant, or not, i.e. the two movement pattern datasets are non-compliant. In particular, the provision of according datasets allows for an efficient automated or machine based evaluation of the passenger's travel. Like this, the performance and the accuracy of the process can be sufficiently high without requiring essential physical installations within the transport system.

By identifying the non-compliance based on the calculated travel movement pattern dataset using the obtained sensor data signal the check-out of the passenger can be assisted or automated. This allows for increasing convenience and accuracy of the check-out step such that the acceptance of the (semi-)automated ticketing system can also be increased. Thereby, the method according to the invention method allows for reliably identifying the usage of the transport system by the passenger and based thereon also for automatically charging the passenger for travelling with the transport system. An extensive or complicated installation of specific tools or devices can be prevented or, at least, such installation can be minimized. Thus, the ticketing method can efficiently be implemented.

In other words, with the method according to the invention mobile device technology can be used to assist passengers by reminding them to check-out or—once sufficient reliability is achieved—to automate such a check-out procedure. Thereby, advantages for the public transport passenger can include prevention of forgotten check-outs up to completely seamless travelling. Public transport system operators profit from higher usage of such systems which involves little or no hardware-investments within their fleets, as well as allows for having opportunities to reduce existing ticketing channels, e.g. ticket vending machines and for making it comparably easy to implement new pricing schemes. By providing a ticketing method implemented by the technical measures according to the invention an easy, low installation effort and cost efficient set-up of an accurate and precise ticketing can be provided at high performance.

In a preferred embodiment of the method according to the invention, the step of the server computer generating the check-out data using the identified non-compliance comprises: the server computer generating a reminder data signal using the identified non-compliance; transferring the reminder data signal from the server computer to the mobile device of the passenger; the mobile device of the passenger providing a reminder alarm to the passenger upon receiving the reminder data signal; the passenger performing an action on the mobile device; the mobile device of the passenger generating a check-out data signal upon the passenger performing the action on the mobile device; transferring the check-out data signal from the mobile device of the passenger to the server computer; and the server computer transforming the check-out data signal to the check-out data.

The term "action" in this context can relate to the user performing a physical activity on the mobile device. For example, the action can be the user pressing a button of the mobile device, touching a screen of the mobile device at a specific location, giving spoken instructions, e.g. to a microphone of the mobile device, or the like.

The term "transforming" in connection with data signals and data can relate to a conversion of the physically transferred electromagnetic signal into a bitstream or the like usable by the server computer or mobile device. In the same step the format of the data can be adapted and augmented in order to be efficiently processed further. Thereby, the data can conveniently be stored in a database run on the server computer or mobile device.

By providing the reminder alarm the mobile device can remind the passenger to perform the checking-out action on the mobile device. Thereby, the mobile device can provide the reminder alarm by displaying a message on a screen of the mobile device, by receiving a text message such as a short message service (SMS) message or an email, by playing an acoustic signal, by providing a haptic information such as a vibration or any combination thereof. Such a system can be a Check-in/assisted Check-out (CIACO) system.

In another preferred embodiment of the method according to the invention, the step of the server computer generating the check-out data using the identified non-compliance comprises: the server computer generating a reminder data signal using the identified non-compliance; transferring the reminder data signal from the server computer to the mobile device of the passenger; the mobile device of the passenger automatically generating a check-out data signal; transferring the check-out data signal from the mobile device of the passenger to the server computer; and the server computer transforming the check-out data signal to the check-out data.

This allows for a fully automated check-out of the passenger which can further increase convenience of the ticketing. Such a system can be a Check-in/Be-out (CIBO) system.

Preferably, the sensor data comprises location data and the sensor of the mobile device comprises a location sensor. Such location data can be global positioning system (GPS) data, mobile telephone communication cell data such as the cell ID, wireless local area network (WLAN) access point data such as Internet Protocol (IP) addresses, or a combination thereof. Correspondingly, the location sensor of the mobile device can be a GPS-module such as a GALILEO-module or a GLONASS-module, a mobile telephone communication antenna, a WLAN antenna or combinations thereof.

Alternatively or in addition thereto, the sensor data preferably comprises motion data and the sensor of the mobile device comprises a motion sensor. Such motion data can be acceleration data, rotational forces data, orientation data, gravity data, or a combination thereof. Correspondingly, the motion sensor of the mobile device can be an accelerometer, a rotational vector sensor, a gyroscope, or combinations thereof.

Further alternatively or in addition thereto, the sensor data comprises environmental data and the sensor of the mobile device comprises an environmental sensor. Such environmental data can be atmospheric pressure data, temperature data, light intensity data, humidity data, or a combination thereof. Correspondingly, the environmental sensor of the mobile device can be a barometer, a thermometer, a photometer, a humidity sensor, or combinations thereof.

Still further alternatively or in addition thereto, the sensor data comprises position data and the sensor of the mobile device comprises a position sensor. Such position data can be geomagnetic field data, orientation data, or a combination thereof. Correspondingly, the position sensor of the mobile device can be a geomagnetic field sensor, an accelerometer, an orientation sensor, or combinations thereof.

By using sensor data and sensors as described hereinbefore, the method according to the invention can be efficiently and accurately implemented. Thereby, recent development of mobile devices such as smartphones make such an implementation comparably easy. By combining plural sensor data stemming from plural different sensors accuracy and efficiency of the ticketing method can further be increased. In particular, by combining a number of indicators provided by the mobile device sensors and/or data accessible within or via the mobile device to determine whether the public transport trip or travel has finished and check-out may be necessary. Combining several of these indicators and statistically monitoring the correlation between indicators and successful prediction of the check-out allows for continuous improvement of the reliability of the system.

More particular, combining sensor data or feedbacks from several of these sources or sensors allows for enhancing the success rate of the ticketing method. Given individual success rates of, e.g., combining three statistically independent elements or sensor data items that individually provide a success rate of 80% each, results in an overall success rate of 99.2%, i.e. $1-(1-0.8)^3$. More generally, if element or sensor data item A delivers an individual success rate $r_A$, element or sensor data item B an individual success rate $r_B$, element or sensor data item C an individual success rate $r_C$, etc., then the overall success rate $r_{tot}$ will be $$r_{tot}=1-(1-r_A)\times(1-r_B)\times(1-r_C)\times \ldots$$

Monitoring the success rate of each individual element or sensor data item allows predicting combined success rates. If full statistical independence of elements is not given, the resulting correlation can be deduced and taken into account.

A preferred option of correlating elements or sensor data can be the location doesn't change or only at very low speed, the passenger is still/walking/cycling and the location is near to a previously used check-in/check-out-location.

Preferably, the ticketing method further comprises defining the transport system movement pattern dataset by evaluating properties of the transport system.

In this context, the term "defining a transport system movement pattern dataset" can relate to any definition allowing for identifying the passenger being in the transport system or not. Thereby, the properties of the transport system may comprise a map of the transport system. By considering the map of the transport system within the transport system movement pattern it can be identified if the passenger leaves the geographical range of the transport vehicle which can be an indication that he left it. Also, the properties of the transport system may comprise data about the vehicle such as, e.g., maximum and average speed, maximum and average acceleration or the like. This allows for efficiently checking-out the passenger.

Preferably, the ticketing method further comprises the server computer defining the transport system movement pattern dataset by evaluating movement data of other mobile devices in the vehicle. Thereby, discrepancies or differences between the movement among mobile devices identified as being in the same vehicle can be established. E.g., if a mobile device identified to be in a vehicle together with other mobile devices does no longer move in conjunction with the other mobile devices it can be concluded that the passenger having the mobile device left the vehicle and checking-out should be performed.

Preferably, the server computer comprises a data storage in which travel movement pattern datasets are stored and the server computer evaluates the stored travel movement pattern datasets for defining the transport system movement pattern dataset. By evaluating stored travel movement pattern deviances of the passenger can be identified and included in checking-out.

Preferably, the ticketing method further comprises: the server computer automatically identifying a compliance of the travel movement pattern dataset with regard to the transport system movement pattern dataset; and the server computer generating the check-in data using the identified compliance. Like this, checking-in of the passenger can be automated with similar means as described above in connection with checking the passenger out. Thereby, the advantages and effects described above can be analogously be implemented in the check-in process.

Thereby, in a preferred embodiment the server computer generating the check-in data using the identified compliance comprises: the server computer generating a reminder data signal using the identified compliance; transferring the reminder data signal from the server computer to the mobile device of the passenger; the mobile device of the passenger providing a reminder alarm to the passenger upon receiving the reminder data signal; the passenger performing an action on the mobile device; the mobile device of the passenger generating a check-in data signal upon the passenger performing the action on the mobile device; transferring the check-in data signal from the mobile device of the passenger to the server computer; and the server computer transforming the check-in data signal to the check-in data. By providing the reminder alarm induced by the server computer the mobile device can remind the passenger to perform the check-in action on the mobile device.

Similar as above, the mobile device can provide the message by displaying an information on a screen of the mobile device, by receiving a text message such as a short message service (SMS) message or an email, by playing an acoustic signal, or any combinations thereof. With such a system the checking-in of the passenger can also be (semi)-automated such that convenience and accuracy of the method can be further increased. Such a system can be a assisted Check-in/assisted Check-out (ACIACO) system or a assisted Check-in/Be-out (ACIBO) system.

In another preferred embodiment, the server computer generating the check-in data using the identified compliance comprises: the server computer generating a reminder data signal using the identified compliance; transferring the reminder data signal from the server computer to the mobile device of the passenger; the mobile device of the passenger automatically generating a check-in data signal; transferring the check-in data signal from the mobile device of the passenger to the server computer; and the server computer transforming the check-in data signal to the check-in data. Such a system can be a Be-in/Assisted Check-out (BIACO) system or a Be-in/Be-out (BIBO) system.

Another aspect of the invention relates to a computer program comprising computer readable commands causing a mobile device to implement a ticketing method according to any one of the preceding claims when being loaded to or executed by the mobile device and/or by a server computer.

Such a computer program allows for efficiently implementing the ticketing method described hereinbefore together with the involved effects and benefits.

These and other aspects of the invention will be apparent from and elucidated with reference to the embodiment(s) described hereinafter.

BRIEF DESCRIPTION OF THE DRAWINGS

The ticketing method according to the invention is described in more detail hereinbelow by way of an exemplary embodiment and with reference to the attached drawing showing a flow scheme of a check-in and check-out process within a ticketing system applying a ticketing method according to the invention.

DESCRIPTION OF EMBODIMENTS

FIG. 1 shows an embodiment of the ticketing method according to the invention. A ticketing system is provided involving a passenger 2 with a smartphone 3 as a mobile device. The ticketing system is applied in a transport system with a bus 4 as a vehicle. The smartphone 3 of the passenger 2 is connected via a mobile data communication link and the Internet to a server computer 5 of the transport system.

The server computer 5 runs a ticketing server software as portion of a computer program for implementing the ticketing method. Within the ticketing server software the passenger 2 is registered. The ticketing server software has billing information of the passenger 2 available. For example, such information allows the ticketing server software to bill usage of the transport system to the passenger directly or included in the mobile communication invoice or the like.

The smartphone 3 comprises plural sensors such as a accelerometer, a GPS module, an antenna and a gyroscope. It further runs a ticketing client software as portion of the computer program for implementing the ticketing method. The ticketing client software is executed in the background of other applications running on the smartphone 3. In the ticketing client software a reference pattern is stored as transport system movement pattern. The reference pattern comprises geographical or location data of the bus stations of the transport system, acceleration data representing regular acceleration and deceleration behavior of the bus 4 and speed data representing regular travel speed of the bus 4.

The ticketing client software continuously evaluates location data of the smartphone 3 by considering the cell ID provided by the antenna and the GPS data provided by the GPS module. It further continuously evaluates acceleration and speed data provided by the accelerometer and the gyroscope. By evaluating the location, acceleration and speed data the ticketing client software continuously calculates a travel movement pattern of the passenger 2.

In a first step 11 the passenger runs for the bus 4. The ticketing client software calculates the travel movement pattern as mentioned before and compares the single elements or evaluated data to the reference pattern. It establishes a success rate or match rate between the travel movement pattern and the reference pattern. Since the evaluated sensors data is not similar enough to the data underlying the reference pattern the success rate is beyond a specified threshold. The threshold can correspond to a likelihood, such as, e.g., a likelihood of 95% or the like.

In a second step 12 the passenger 2 enters the bus 4. The ticketing client software still evaluates the sensor data and the success rate. Since the evaluated sensor data is now in range of the data underlying the reference pattern the success rate exceeds the threshold and the ticketing client software identifies compliance of the travel movement pattern with regard to the reference pattern. Thus, it provides a message and a sound signal to the passenger 2 reminding him of checking-in to the ticketing system. The passenger 2 confirms check-in to the server computer 5 via the ticketing client software.

In a third step 13 the passenger rides the bus 4. The ticketing client software still evaluates the sensor data and the success rate. Since the evaluated sensor data still is in range of the data underlying the reference pattern the success rate still exceeds the threshold. Thus, the passenger stays checked-in.

In a fourth step 14 the passenger 2 leaves the bus 4. In a fifth step 15 the ticketing client software evaluates the sensor data and the success rate. Since the passenger 2 exited the bus 4 the evaluated sensor data is no longer in range of the data underlying the reference pattern. Thus, the success rate falls beyond the threshold and the ticketing client software identifies non-compliance of the travel movement pattern with regard to the reference pattern. As a result thereof, it provides a message and a sound signal to the passenger 2 reminding him of checking-out from the ticketing system. The passenger 2 confirms check-out to the server computer 5 via the ticketing client software.

The ticketing server software on the server computer 5 calculates a price for the travel of the passenger 2 with the bus 4. Therefore, it evaluates the information gathered about the checking-in and information about the checking-out of the passenger 2. Based on this calculation it issues a service ticket of this price and charges the passenger for the service ticket.

While the invention has been illustrated and described in detail in the drawings and foregoing description, such illustration and description are to be considered illustrative or exemplary and not restrictive. It will be understood that changes and modifications may be made by those of ordinary skill within the scope and spirit of the following claims. In particular, the present invention covers further embodiments with any combination of features from different embodiments described above and below. For example, it is possible to operate the invention in an embodiment wherein:

The ticketing client software does not provide a message to the passenger requiring confirmation when compliance between the travel movement pattern and the reference pattern is identified but directly provides check-in information to the server computer (Be-In).

Similarly, the ticketing client software does not provide a message to the passenger requiring confirmation when non-compliance between the travel movement pattern and the reference pattern is identified but directly provides check-out information to the server computer (Be-Out).

The invention also covers all further features shown in the Fig. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfill the functions of several features recited in the claims. The order single steps of a method have in a claim does not represent a sequence of the step which has to be followed. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. Any reference signs in the claims should not be construed as limiting the scope.

A computer program may be stored/distributed on a suitable medium, such as an optical storage medium or a solid-state medium supplied together with or as part of other hardware, but may also be distributed in other forms, such as via the Internet or other wired or wireless telecommunication systems. In particular, e.g., a computer program can be a computer program product stored on a computer readable medium which computer program product can have computer executable program code adapted to be executed to implement a specific method such as the method according to the invention. Furthermore, a computer program can also be a data structure product or a signal for embodying a specific method such as the method according to the invention.

The invention claimed is:

1. A ticketing method for charging a passenger for using a transport system, comprising:

checking-in the passenger via a mobile device of the passenger upon accessing a vehicle of the transport system;

checking-out the passenger via the mobile device upon exiting the vehicle of the transport system;

a server computer automatically calculating a price for a travel of the passenger within the transport system by evaluating check-in data representing the checking-in of the passenger and check-out data representing the checking-out of the passenger;

a sensor of the mobile device of the passenger generating a sensor data signal; and transferring the sensor data signal from the mobile device of the passenger to the server computer;

the server computer automatically calculating a travel movement pattern dataset based on sensor data associated to the transferred sensor data signal;

the server computer automatically comparing the travel movement pattern dataset to a transport system movement pattern dataset;

the server computer automatically identifying a non-compliance of the travel movement pattern dataset with regard to the transport system movement pattern dataset; and the server computer generating the check-out data using the identified non-compliance.

2. The ticketing method according to claim 1, wherein the server computer generating the check-out data using the identified non-compliance comprises, the server computer generating a reminder data signal using the identified non-compliance;

transferring the reminder data signal from the server computer to the mobile device of the passenger;

the mobile device of the passenger providing a reminder alarm to the passenger upon receiving the reminder data signal;

the passenger performing an action on the mobile device;

the mobile device of the passenger generating a check-out data signal upon the passenger performing the action on the mobile device;

transferring the check-out data signal from the mobile device of the passenger to the server computer; and the server computer transforming the check-out data signal to the check-out data.

3. The ticketing method according to claim 1, wherein the server computer generating the check-out data using the identified non-compliance comprises, the server computer generating a reminder data signal using the identified non-compliance;

transferring the reminder data signal from the server computer to the mobile device of the passenger;

the mobile device of the passenger automatically generating a check-out data signal;

transferring the check-out data signal from the mobile device of the passenger to the server computer; and the server computer transforming the check-out data signal to the check-out data.

4. The ticketing method according to claim 1, wherein the sensor data comprises location data and the sensor of the mobile device comprises a location sensor.

5. The ticketing method according to claim 1, wherein the sensor data comprises motion data and the sensor of the mobile device comprises a motion sensor.

6. The ticketing method according to claim 1, wherein the sensor data comprises environmental data and the sensor of the mobile device comprises an environmental sensor.

7. The ticketing method according to claim 1, wherein the sensor data comprises position data and the sensor of the mobile device comprises a position sensor.

8. The ticketing method according to claim 1, further comprising defining the transport system movement pattern dataset by evaluating properties of the transport system.

9. The ticketing method according to claim 1, further comprising the server computer defining the transport system movement pattern dataset by evaluating movement data of other mobile devices in the vehicle.

10. The ticketing method according to claim 1, wherein the server computer comprises a data storage in which travel movement pattern datasets are stored and the server computer evaluates the stored travel movement pattern datasets for defining the transport system movement pattern dataset.

11. The ticketing method according to claim 1, further comprising the server computer automatically identifying a compliance of the travel movement pattern dataset with regard to the transport system movement pattern dataset; and the server computer generating the check-in data using the identified compliance.

12. The ticketing method according to claim 11, wherein the server computer generating the check-in data using the identified compliance comprises the server computer generating a reminder data signal using the identified compliance;

transferring the reminder data signal from the server computer to the mobile device of the passenger;

the mobile device of the passenger providing a reminder alarm to the passenger upon receiving the reminder data signal;

the passenger performing an action on the mobile device;

the mobile device of the passenger generating a check-in data signal upon the passenger performing the action on the mobile device;

transferring the check-in data signal from the mobile device of the passenger to the server computer;

the server computer transforming the check-in data signal to the check-in data.

13. The ticketing method according to claim 11, wherein the server computer generating the check-in data using the identified compliance comprises the server computer generating a reminder data signal using the identified compliance;

transferring the reminder data signal from the server computer to the mobile device of the passenger;

the mobile device of the passenger automatically generating a check-in data signal;

transferring the check-in data signal from the mobile device of the passenger to the server computer; and the server computer transforming the check-in data signal to the check-in data.

14. The ticketing method according to claim 1, wherein the step of checking-in the passenger and the step of checking-out the passenger are performed without use of a physical installation within the transport system.

15. A non-transitory computer readable medium storing computer readable commands configured to cause a server computer to implement a ticketing method by:

receiving a checking-in of a passenger via a mobile device of the passenger upon accessing a vehicle of a transport system;

receiving a checking-out of the passenger via the mobile device upon exiting the vehicle of the transport system;

transferring a sensor data signal from the mobile device of the passenger to the server computer;

calculating a travel movement pattern dataset based on sensor data associated with the sensor data signal;

comparing the travel movement pattern dataset to a transport system movement pattern dataset;

identifying a non-compliance of the travel movement pattern dataset with regard to the transport system movement pattern dataset;

generating check-in data representing the checking-in of the passenger;

generating check-out data using the identified non-compliance; and calculating a price for a travel of the passenger within the transport system by evaluating the check-in data representing the checking-in of the passenger and the check-out data representing the checking-out of the passenger.

16. The non-transitory computer readable medium of claim 15, wherein receiving the checking-in of the passenger and the checking-out of the passenger are performed without use of a physical installation within the transport system.

* * * * *